United States Patent
Chockalingam (10) Patent No.: US 11,751,036 B2
(45) Date of Patent: Sep. 5, 2023

(54) EMERGENCY RICH COMMUNICATION SERVICES

(71) Applicant: T-Mobile USA, Inc., Bellevue, WA (US)

(72) Inventor: Ramaswamy Chockalingam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/109,047

(22) Filed: Dec. 1, 2020

(65) Prior Publication Data

US 2022/0174462 A1 Jun. 2, 2022

(51) Int. Cl.
 *H04W 4/90* (2018.01)
 *H04W 4/12* (2009.01)

(52) U.S. Cl.
 CPC .............. *H04W 4/90* (2018.02); *H04W 4/12* (2013.01)

(58) Field of Classification Search
 CPC ................................. H04W 4/90; H04W 4/12
 USPC ........................................................ 455/404
 See application file for complete search history.

(56) References Cited

U.S. PATENT DOCUMENTS

| | | | |
|---|---|---|---|
| 9,516,620 B1 * | 12/2016 | Upp | H04L 65/1016 |
| 10,291,777 B1 * | 5/2019 | Luo | H04M 3/2272 |
| 10,524,106 B1 * | 12/2019 | Skertich | H04M 3/42221 |
| 10,687,254 B2 * | 6/2020 | Nimbavikar | H04L 67/306 |
| 11,171,828 B2 * | 11/2021 | Bouvet | H04L 65/1045 |
| 2007/0253412 A1 * | 11/2007 | Batteram | H04L 65/1101 370/389 |
| 2009/0270099 A1 * | 10/2009 | Gallagher | H04W 8/08 370/352 |
| 2019/0386917 A1 * | 12/2019 | Malin | H04L 67/63 |
| 2019/0387030 A1 * | 12/2019 | Sridhar | H04L 65/1069 |
| 2020/0068446 A1 * | 2/2020 | Nimbavikar | H04L 47/20 |
| 2020/0213367 A1 * | 7/2020 | Chiang | H04L 65/1006 |
| 2020/0275313 A1 * | 8/2020 | He | H04W 28/08 |
| 2022/0248208 A1 * | 8/2022 | Nayak | H04L 65/1104 |

* cited by examiner

*Primary Examiner* — CongVan Tran
(74) *Attorney, Agent, or Firm* — Lee & Hayes, P.C.

(57) ABSTRACT

A fifth generation (5G) network can provide Rich Communication Services (RCS) between a user equipment (UE) and an emergency control center. An RCS server in an IP Multimedia Subsystem (IMS) can be used to transfer data associated with a chat, an image, and/or a video between the UE and a public service answering point (PSAP) associated with the emergency control center. The RCS server can initiate, establish, maintain, format, augment, or otherwise determine a rich communication service between the UE and the PSAP over the 5G network.

20 Claims, 7 Drawing Sheets

EMERGENCY RICH COMMUNICATION SERVICES

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques for providing Rich Communication Services (RCS) over a 5G network are discussed herein. For instance, the techniques may be used to transfer data associated with a chat, an image, a video, and the like, from a user equipment (UE) to an emergency control center. In some examples, the UE may send data comprising a video to the emergency control center (e.g., a 911 Center that provides emergency services) for use in responding to an emergency event. Using the techniques described herein, an RCS server can initiate, establish, maintain, format, augment, or otherwise determine a rich communication service between a UE and an emergency control center over a 5G network.

The systems and techniques disclosed herein may provide for processing larger amounts and/or more complex data by employing an RCS server that can generate and/or format a communication comprising a rich communication service (e.g., a chat, an image, a video, and so on) between a UE and an emergency control center. In some examples, the RCS server may be part of an Internet Protocol (IP) Multimedia Subsystem (IMS) that can receive a request for a communication associated with one or more rich communication services from a UE, and identify a protocol for sending the communication to a public service answering point (PSAP). The IMS may also or instead configure the communication for sending to the PSAP by determining a protocol conversion between the protocol associated with the communication from the UE, and the protocol associated with the PSAP (e.g., a protocol that is usable for receiving and sending emergency communication(s) by the PSAP). By using the protocol conversion determined by the IMS, the PSAP can receive the request from the UE and respond to the communication request from the UE.

The techniques described herein can enable secure data exchange between the UE and the PSAP over a 5G network including initiating, establishing, maintaining, or otherwise determining a message that includes one or more rich communication services. By way of example and not limitation, a UE may send a message comprising an image or a video of an emergency event (e.g., a medical event, a criminal event, an environmental event, and so on) proximate to the UE to an answering point responsible for receiving emergency communications. In such an example, a server associated with an IMS (e.g., and/or an RCS server) may augment or adjust the message so that the message can be recognized by the answering point. In some examples, the IMS may receive data associated with the message from at least one of: a proxy call session control function (PCSCF) server, an emergency call session control function (ECSCF) server, or a gateway mobile location center (GMLC), just to name a few. The IMS may format the message received from the UE for sending to the answering point based at least in part on the data received from one or more of the aforementioned components. In various examples, the IMS may append location information of the UE (e.g., the emergency event), determine a protocol usable by the ECSCF, or otherwise enable the message to be received by the answering point. In this way, the answering point can provide emergency services related to the emergency event based at least in part on receiving the message with the one or more rich communication services. Further description of providing RCS services to a public service answering point can be found throughout this disclosure including in the figures below.

Figure 1:
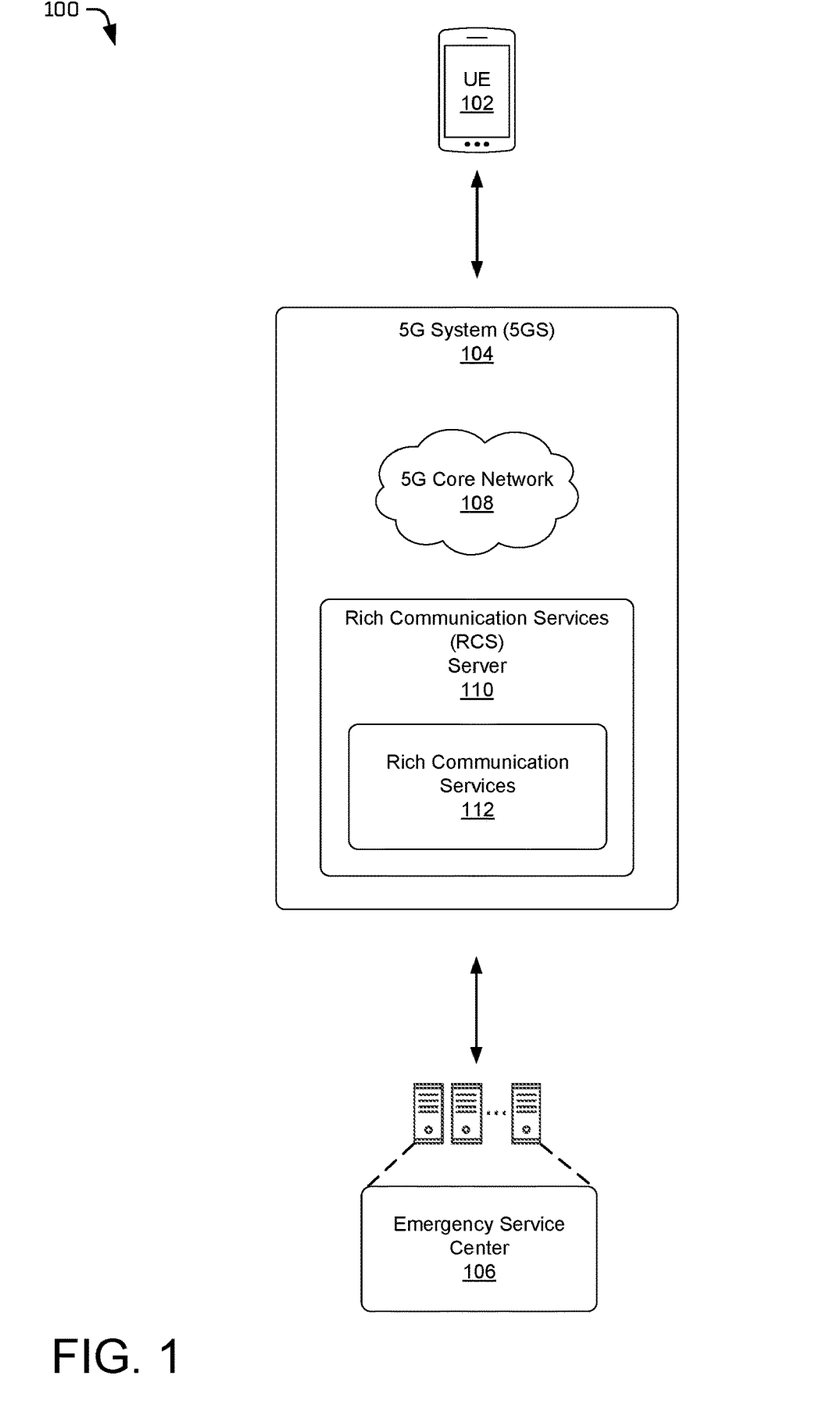
FIG. 1 depicts an example network environment in which a user equipment can connect to a telecommunication network to implement the techniques described herein.

FIG. 1 depicts an example network environment 100 in which an example user equipment (UE) can connect to a telecommunication network to engage in communication sessions for voice calls, video calls, messaging, data transfers, or other types of communications. For example, the UE 102 can connect to a 5G system 104 for sending a communication to an emergency service center 106 (e.g., a PSAP or other public emergency service).

As depicted in FIG. 1, the 5G system 104 comprises a 5G core network 108 and a rich communications services (RCS) server 110 that is configured to provide rich communication services 112 between the UE 102 and the emergency service center 106. In some examples, the UE 102 can generate a message that includes a connection request to the emergency service center 106. The message can be sent over the 5G core network 108 for processing by the RCS server 110 which can perform functionality as described herein (including formatting the message for sending to the emergency service center 106 as a communication session over a unique channel. In some examples, the RCS server 110 can be coupled to or otherwise be incorporated as part of an IMS (not shown).

Generally, the emergency service center 106 receives communications in accordance with a protocol associated with an emergency communication whereas a different protocol is typically used for communications among the 5G core network 108. In some examples, the RCS server 110 can convert a first protocol associated with the message from the UE 102 to a second protocol associated with the emergency service center 106, and cause the message to be sent to the emergency service center 106 in accordance with the second protocol. In various examples, the RCS server 110 can receive, manage, and otherwise store user information, location information, registration information, motion information, and other information associated with the UE 102, and include some or all of the information during communications.

In some examples, the RCS server 110 can provide functionality to associate, convert, identify, or otherwise determine a protocol usable to send RCS communications between a UE and a PSAP independent of whether the UE uses a different protocol from a protocol associated with the PSAP. The RCS server 110 can also or instead determine a protocol for the UE regardless of whether the protocol of the UE is from another telecommunications operator, carrier, or provider that may employ different types of telecommunications systems different from the 5G system 104.

The UE 102 represents any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 102 is illustrated in greater detail in FIG. 7.

In various examples, the 5G system 104 can represent functionality to provide communications between the UE 102 and the emergency service center 106, and can include one or more radio access networks (RANs), as well as one or more core networks linked to the RANs. For instance, a UE 102 can wirelessly connect to a base station or other access point of a RAN, and in turn be connected to the 5G core network 108. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the 5G system 104 is compatible to operate with other radio technologies including those of other service providers. Accordingly, a message from the UE 102 may originate with another service provider (e.g., a third-party) and be processed by the RCS server 110 independent of the technology or core network associated with the service provider.

In some examples, the 5G core network 108 can represent a service-based architecture that includes multiple types of network functions that process control plane data and/or user plane data to implement services for the UE 102. In some examples, the services comprise the rich communication services 112 which may include a text, a data file transfer, an image, a video, a combination thereof, and so on. The network functions of the 5G core network 108 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIGS. 2A and 2B, and elsewhere.

Figure 2:
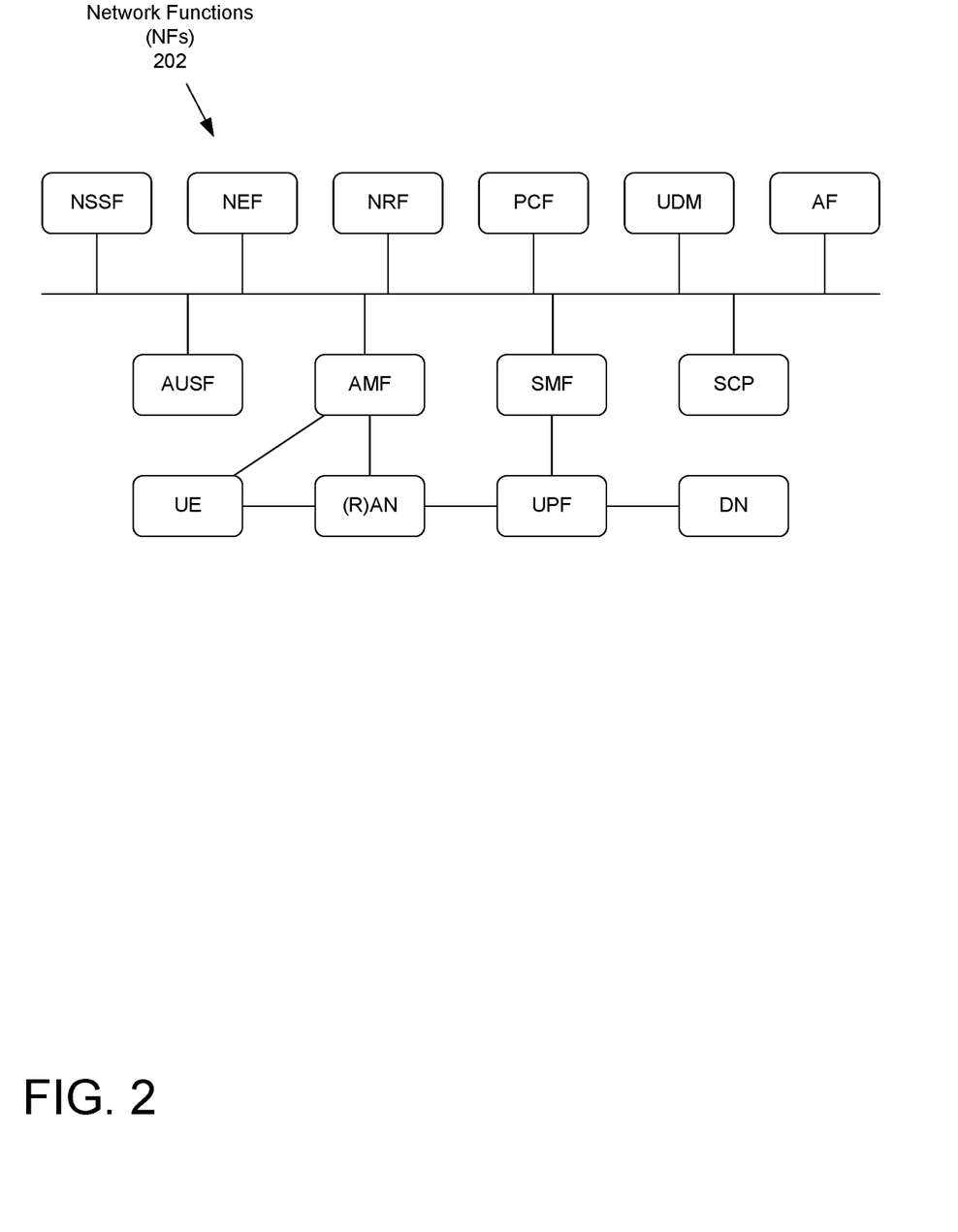
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 108 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 106), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G network 108 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

The 5G core network 108 can, in some examples, determine a connection between an Internet Protocol (IP) Multimedia Subsystem (IMS) that manages a communication session for the UE 102, including sessions for voice calls, video calls, and/or other types of communications. For example, the UE 102 and the IMS can exchange Session Initiation Protocol (SIP) messages to set up and manage individual communication sessions. Further discussions of exchanging a SIP message are included throughout this disclosure including in FIGS. 4 and 5.

Figure 3:
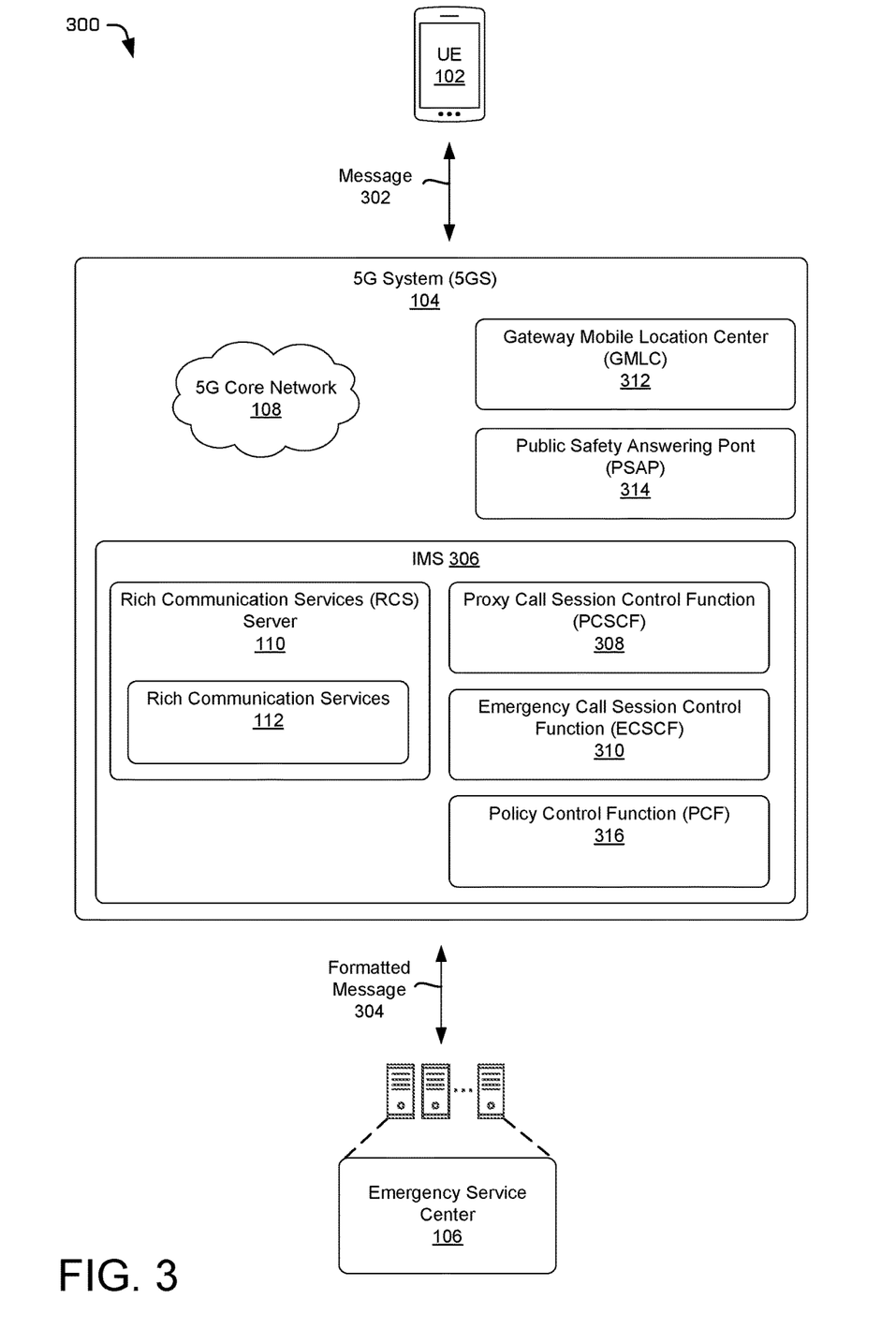
FIG. 3 depicts another example network environment in which a user equipment can connect to a telecommunication network to implement the techniques described herein.

FIG. 3 depicts another example network environment in which a user equipment can connect to a telecommunication network to implement the techniques described herein. As illustrated in FIG. 3, the UE 102 can communicate (e.g., send and/or receive) a message 302 to the 5G system 104 which can modify, configure, adjust, augment, or otherwise format the message 302 as a formatted message 304 for sending to the emergency service center 106.

As shown in FIG. 3, the 5G system 104 comprises an IMS 306, which comprises a proxy call session control function (PCSCF) 308 and an emergency call session control function (ECSCF) 310, and a Policy Control Function (PCF) 316. The 5G system 104 also comprises a gateway mobile location center (GMLC) 312 and a public safety answering point (PSAP) 314.

In some examples, the message 302 can represent a communication request from the UE 102 that includes one or more rich communication services 112. For instance, the message 302 can include text, a video, an image, or a file related to an emergency event for sending to the emergency service center 106. The formatted message 304 can represent a modification made to the message 302 for compatibility with the PSAP 314 (e.g., augment the message by determining a protocol for the formatted message 304 that is recognizable by the PSAP 314 (e.g., convert a protocol associated with the message 302 to another protocol compatible with the PSAP 314).

Generally, the IMS 306 can format the message 302 received from the UE 102 by the PCSCF 308 for sending to the emergency service center 106 based at least in part on data associated with the message 302. For instance, the message 302 may comprise an RCS service, such as a video of an emergency event, and the IMS 306 may determine the formatted message 304, and initiate sending of the formatted message to the emergency service center 106 by way of the PCSCF 308, the ECSCF 310, and/or the GMLC 312.

The PCSCF 308 can represent functionality of a proxy server that receives data from the UE 102 at the IMS 306. That is, the PCSCF 308 can establish and maintain communications between one or more UEs (including UEs of third-parties having unique communication requirements) and various answering points.

In some examples, the ECSCF 310 can implement functionality to configure the message 302 for sending between the PSAP 314 and the IMS 306 for delivery to the emergency service center 106. For instance, the ECSCF 310 can retrieve location information from the GMLC 312 and/or communicate data with the RCS server 110 (e.g., data associated with the message 302 and/or the formatted message 304). Additionally or alternatively, the IMS 306 can determine a protocol usable by the ECSCF 310 for communicating the formatted message 304 to the emergency service center 106. In this way, the emergency service center 106 can provide emergency services related to the emergency event associated with the UE 102 based at least in part on receiving the message 304 with the one or more rich communication services 112. Further description of providing RCS services to a public service answering point can be found throughout this disclosure.

In some examples, the RCS server 110 can determine a difference between a protocol associated with communicating the message 302 from the UE 102 over the network and the protocol for sending the formatted message 304 to the PSAP 314. In such examples, the RCS server can determine, based at least in part on the difference, a conversion value (e.g., a protocol conversion value). In various examples, the conversion value can be used by the RCS server 110 to convert the protocol associated with communicating the message 302 from the UE 102 to a new and/or modified protocol for sending the formatter message 304 to the PSAP 314. In some examples, the RCS server 110 can identify the protocol associated with the PSAP 314 for sending the formatted message 304 based at least in part on the conversion value (e.g., can identify a protocol usable by the UE 102 and the PSAP 314 for communication of RCS service 112).

The RCS server 110 may, in various examples, receive a conversion value representing a protocol conversion node from a third-party provider that is usable by the RCS server 110 to determine a protocol that enables communication between the UE 102 and the PSAP 314.

In various examples, the IMS 306 may append location information of the UE 102 (e.g., the emergency event) based at least in part on data exchanged with the ECSCF 310 and/or the GMLC 312. For example, the formatted message 304 may comprise location information of the UE 102 that is added to the message 302 based at least in part on location information received from the GMLC 312. In various examples, responsive to receiving the message 302, the IMS 306 may send a request for location information (e.g., a location query) to the ECSCF 310, which in turn may send a request for location information to the GMLC 312. In such examples, the IMS 306 may receive location information (e.g., a location response) from the GMLC 312 usable by the PSAP 314 to identify a location of the UE 102. In this way, the PSAP 314 may receive the formatted message 304 with location information that can be helpful during a response to the emergency event. In particular, a location of the UE 102, user information (e.g., medical information), and the like can be shared with the emergency service center 106 to enable an improved response to a medical event, a crime in progress, a natural disaster, and so on. In some examples, the RCS server 110 can deliver receipts (e.g., a visual and/or audio indicator) to the UE 102 and/or the PSAP 314 to indicate a status of the message 302 and/or the formatted message 304. For instance, upon delivery of the formatted message 304 to the PSAP 314, the RCS server 110 can send a message to the UE 102 indicating that the formatted message 304 was delivered to the PSAP 314. The RCS server 110 may also or instead send a message to the UE 102 indicating that the formatted message was read by the PSAP 314.

In various examples, the RCS services 112 associated with the formatted message 304 can be communicated over the 5 g system 104 (e.g. using the 5 g core network 108) to the PSAP 314 in substantially real-time. That is, given the capabilities of the 5G system 104 relevant to previous telecommunication networks, the IMS 306 can implement the RCS server 110 to provide the RCS services 112 between the UE 102 and the emergency service center 106 (via the PSAP 314, for example). Accordingly, one or more users of one or more UEs can transfer pictures, videos, and/or files of various size (e.g., 100 Kilobytes, 1 Megabyte, 5 Megabytes, 10 Megabytes, and so on) to a 911 control room or other public service entity.

In some examples, the ECSCF 310 may send an "invite" request to the PSAP 314, send a location query to the GMLC 312, and/or send a request for a protocol conversion to the PSAP 314 (or a third-party partner that provides protocol conversion services/values). The ECSCF 310 may also, in some examples, receive location data and/or protocol data (e.g., a protocol, a protocol conversion value, etc.) from the ECSCF 310 and/or the GMLC 312.

In some examples, the PCF 316 may communicate one or more AAR diameter messages with the PCSCF 308. The PCF 316 may also or instead communicate (e.g., send and/or receive) an N7 notify message comprising one or more of: 5QI, ARP, or charging rule base names with audio and/or video rules, to an SMF (e.g., an SMF configured for emergency services). By way of example and not limitation, the PCF 316 can send a response to the PCSCF 308 indicating receipt of a AAA diameter message.

Figure 4:
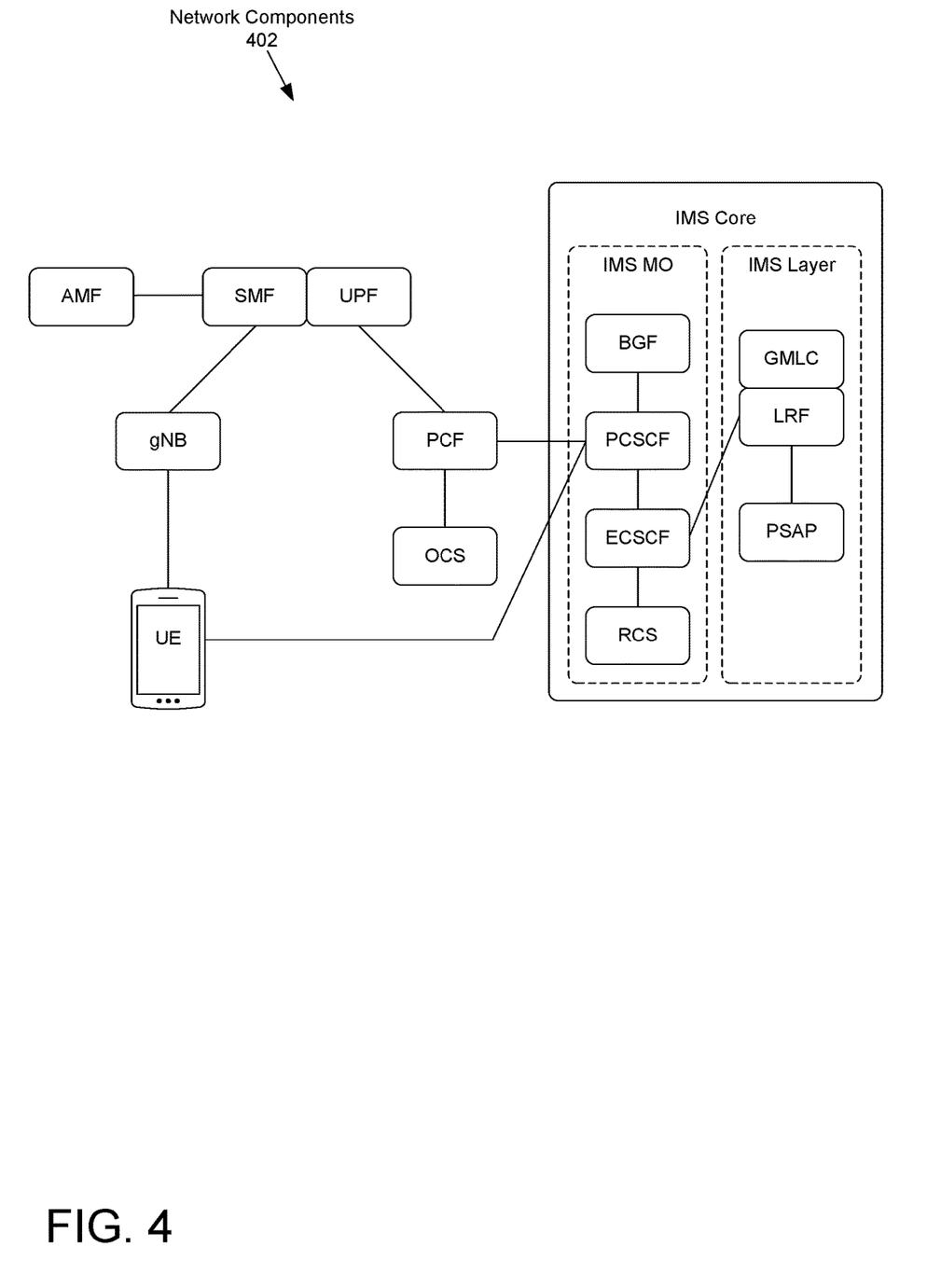
FIG. 4 depicts another example system architecture for a fifth generation (5G) telecommunication network.

FIG. 4 depicts another example system architecture for a fifth generation (5G) telecommunication network. In some examples, the telecommunication network can comprise the 5G core network 108 in FIG. 1 that includes a service-based system architecture in which different types of network components 402 operate alone and/or together to implement services. For instance, the network components 402 can comprise network functions, hardware, software, a combination thereof, or other implementations.

As shown in the example system architecture of FIG. 4, the network components 402 that can be associated with 5G telecommunication networks (e.g., the 5G core network 106) comprises one or more of: User Equipment (UE), a base station (gNB), Access and Mobility Management Function (AMF), Session Management Function (SMF), User Plane Function (UPF), Policy Control Function (PCF) (e.g., the PCF 316), Online Charging System (OCS), an internet protocol (IP) Multimedia Subsystem (IMS) Core comprising an IMS Management Object (MO) that further comprises a proxy call session control function (PCSCF), a Border Gateway Function (BGF), an emergency call session control function (ECSCF), and a Rich Communication Server (RCS), and an IMS layer comprising a gateway mobile location center (GMLC), a Location Retrieval Function (LRF), and a public safety answering point (PSAP).

In some examples, the example system architecture of FIG. 4 can implement techniques to provide RCS services between a UE and a PSAP. For instance, a message from a UE (e.g., the message 302 from the UE 102) may comprise an RCS service, such as a video of an emergency event, and the IMS Core (e.g., the IMS 306) may determine, augment, and/or format the message (e.g., the formatted message 304) for sending to an emergency service center (e.g., emergency service center 106).

In various examples, the UE can send the message via one or more of: the gNB, the SMF, the UPF, the PCF, the AMF, or the OCS to the PCSCF (e.g., the PCSCF 308). In other examples, the UE may send the message to the PCSCF without requiring all of the gNB, the SMF, the UPF, the PCF, the AMF, and/or the OCS.

In some examples, the PCSCF may communicate or otherwise exchange data with the BGF, the ESCCF, and/or the RCS server (e.g., the RCS server 110), just to name a few. In various examples, the ECSCF may communicate with the GMLC/LRF and/or the ECSCF may communicate with the PSAP. In some examples, the IMS layer can represent a transport layer, a service layer, an application layer, or other type of layer implemented by the IMS Core. To provide RCS services between the UE and the PSAP, the network components 402 can implement the RCS server to format the message 302 received from the UE including determining a protocol that is recognized by an emergency service center associated with the PSAP and/or initiating a Session Initiation Protocol (SIP) messaging flow.

Figure 5:
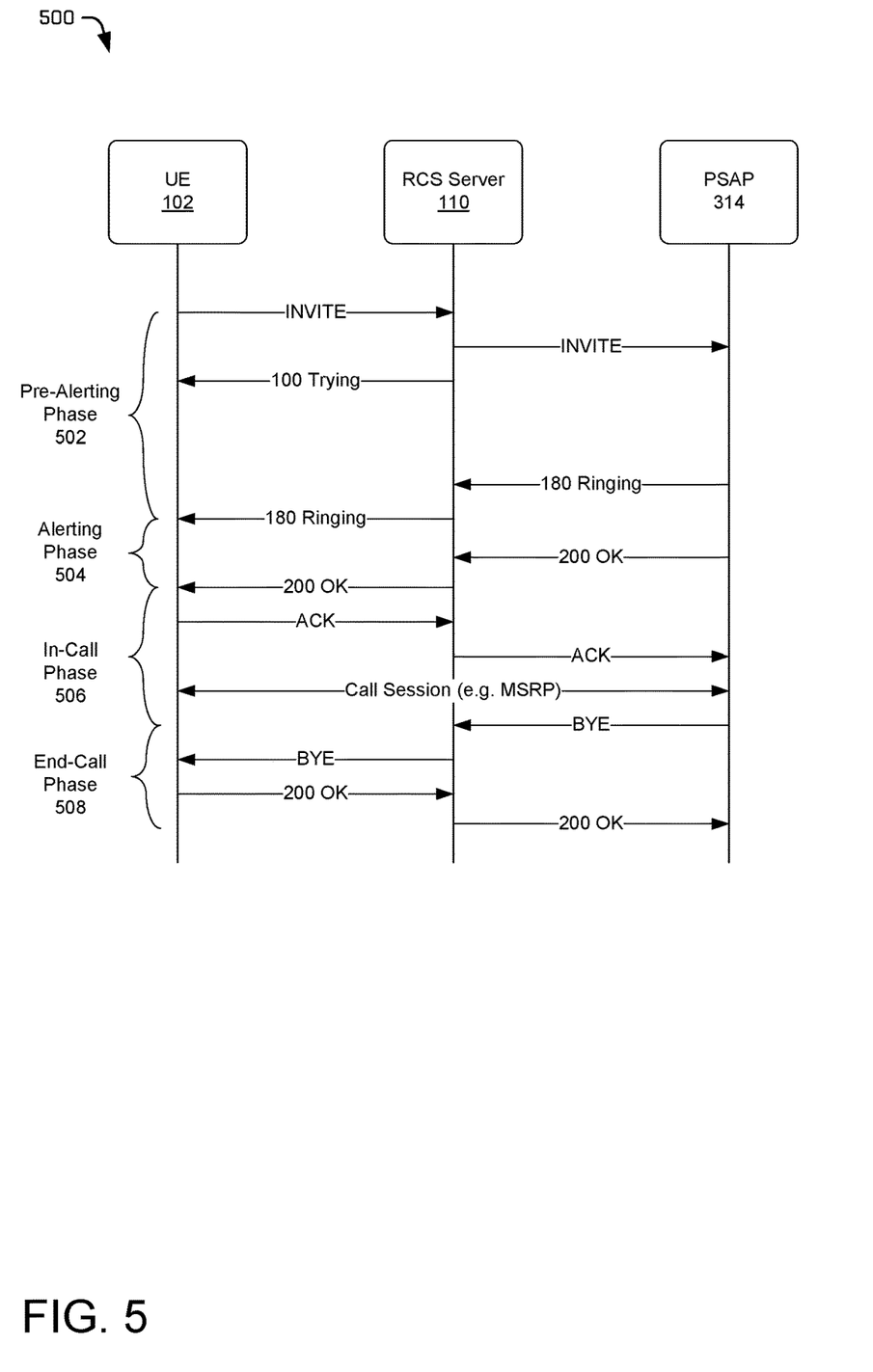
FIG. 5 depicts a Session Initiation Protocol (SIP) messaging flow during a typical call setup through an internet protocol (IP) Multimedia Subsystem (IMS), which may include an example rich communications services server.

FIG. 5 depicts a Session Initiation Protocol (SIP) messaging flow during a typical call setup through an internet protocol (IP) Multimedia Subsystem (IMS), which comprises an example rich communications services server. For example, the UE 102 may send the message 302 to the RCS server 110 which can send the formatted message 304 to the PSAP 314. Though the RCS server 110 is illustrated in FIG. 5 individually, it is understood that the RCS server 110 (of functionality provided therefrom) may be directly coupled to and/or integrated into the IMS 306. However, in other examples functionality provided by the RCS server 110 may be implemented as a system separate from the IMS 306 (e.g., to provide RCS services to other network architectures and/or other network operators).

In some examples, a SIP messaging flow as shown in FIG. 5 can represent activity to establish and maintain a communication (e.g., the message 302 and/or the formatted message 304) between the UE 102 and the PSAP 314. For example, a UE 102 can send a SIP INVITE message to the RCS server 110 (e.g., the IMS 306) to initiate a call to the PSAP 314 (e.g., a terminating UE, not shown). The RCS server 110 can forward the SIP INVITE message to the PSAP 314, and also send back a "100 Trying" message to the UE 102. When the PSAP 314 receives the SIP INVITE message, it can respond with a "180 Ringing" message to the RCS server 110 to indicate that PSAP 314 is now ringing to alert a user of the call attempt, and the RCS server 110 can forward the "180 Ringing" message to the UE 102.

In some examples, the UE 102 may respond to a "180 Ringing" message by playing back a local ringback tone for a user of the UE 102. Relative to the UE 102, the period between sending the SIP INVITE message and receiving the "180 Ringing" message indicating that the PSAP 314 is ringing can be known as a pre-alerting phase 502. In some examples, the PSAP 314 can also send other types of messages during the pre-alerting phase 502 such as "183 Session in Progress" message to the RCS server 110 which may also be forwarded to the UE 102 (not shown).

In examples during the pre-alerting phase 502, the RCS server 110 may configure the call for sending to the PSAP 314 by altering the call to include a location of the UE 102, user information associated with the UE 102, and/or a protocol recognizable by the PSAP 314 for sending and/or receiving calls.

Upon the PSAP 314 answering the call, a "200 OK" message can be sent to the RCS server 110 for forwarding to the UE 102. In some examples, messages such as a "183 Session in Progress" or a "200 OK" message can include a Session Description Protocol (SDP) element that indicates which types of protocols or codecs the PSAP supports for voice, video, RCS service, or other calls.

In some examples, relative to the UE 102, the period between receiving the "180 Ringing" message indicating that the PSAP 314 is ringing and receiving the "200 OK" message indicating that the PSAP 314 has answered the call can be known as an alerting phase 504. In other examples, the alerting phase 504 may begin at any other point, such as after the UE 102 receives a "183 Session in Progress" message that includes SDP information about the PSAP 314 (in which case the pre-altering phase 502 may no longer comprise the "183 Session in Progress" message).

In some examples, the PCSCF 308 may send AAR diameter message(s) to the PCF 316 which may cause the PCF 316 to send an N7 notify message with one or more of: 5QI, ARP, or charging rule base names with audio and/or video rules, to the SMF for the emergency services. In some examples, the PCF 316 can send a response to the PCSCF indicating a AAA diameter message.

In examples after the UE 102 receives the "200 OK" message, the UE 102 can send an acknowledgement (ACK) to the PSAP 314 via the RCS server 110 to indicate that the call session can begin. In this way, a call session can be established and maintained between the UE 102 and the PSAP 314 which can be known as an in-call phase 506. As shown in FIG. 3, the in-call phase 506 comprises a call session for communicating RCS services 112 which may include Message Session Relay Protocol (MSRP) messages. The call session may be determined based at least in part on the RCS server 110 identifying characteristics of the call (e.g., a user, a location, a protocol conversion, and/or an RCS service type) and modifying the call for receipt by the PSAP 314.

As shown in an end-call phase 508 in FIG. 5, to end the call one of the UE 102 or the PSAP 314 can send a "BYE" message to the other of the UE 102 or the PSAP 314 through the RCS server 110. In some examples, the other of the UE 102 or the PSAP 314 can confirm the end of the call with an "200 OK" message sent through the RCS server 110. In various examples, sending a "BYE" message may cause or otherwise trigger a STR diameter message between the PCSCF and the PCF. In such examples, the STA message indicates an acknowledgement of releasing the resources.

Figure 6:
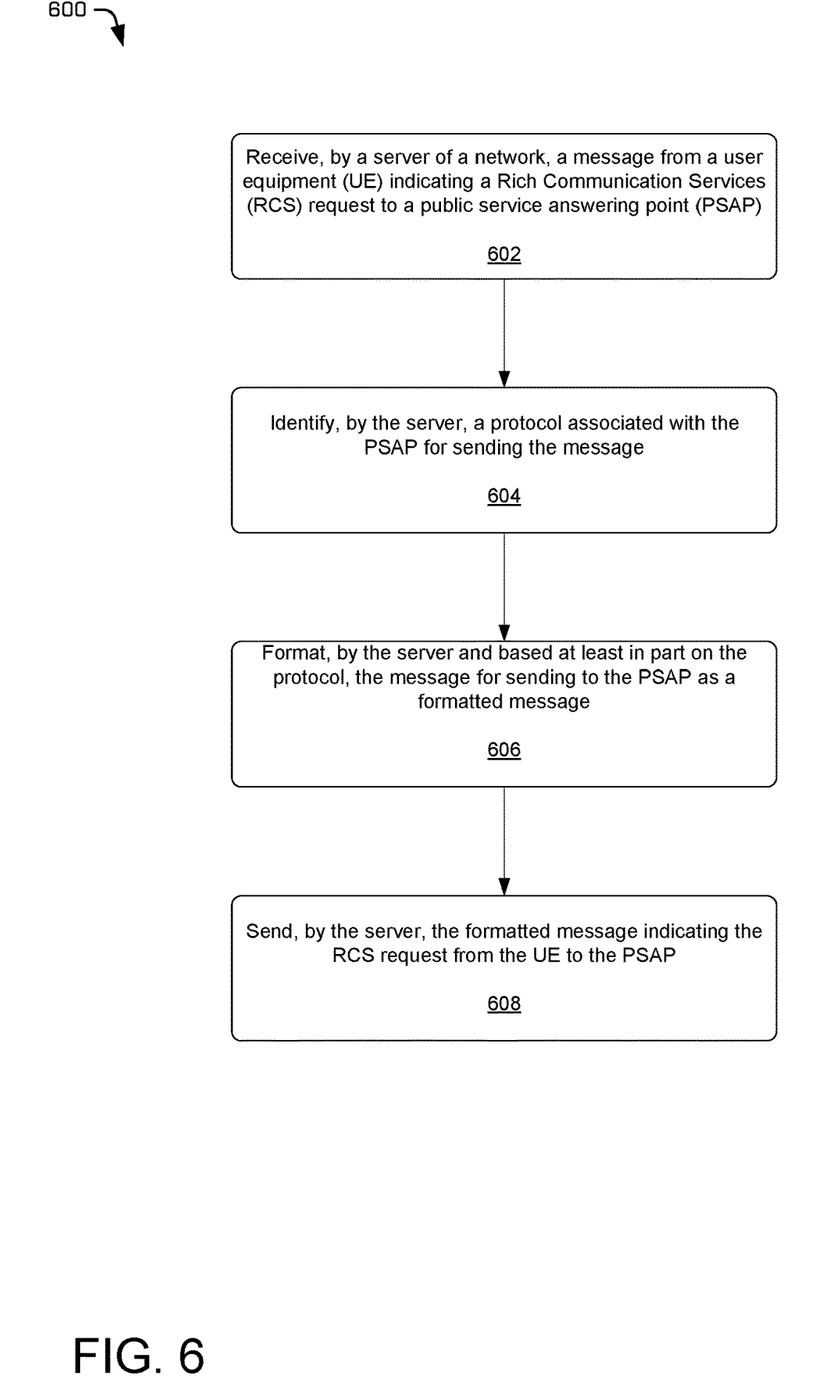
FIG. 6 depicts a flowchart of an example process for providing rich communication services between an example user equipment and an example public service access point.

FIG. 6 depicts a flowchart of an example process 600 for providing rich communication services between an example user equipment and an example public service access point. Some or all of the process 600 may be performed by one or more components in FIGS. 1-4, as described herein. For example, some or all of process 600 may be performed by the RCS server 110 and/or the IMS 306.

At operation 602, the process may include receiving, by a server of a network, a message from a user equipment (UE) indicating a Rich Communication Services (RCS) request to a public service answering point (PSAP). In some examples, the operation 602 may include the RCS server 110 receiving a message from the UE 102 comprising one or more RCS services 112. By way of example and not limitation, a UE of a fifth generation system that includes a fifth generation core network can send a message comprising an image, a video, and/or a file transfer to the RCS server 110 requesting a communication session with an emergency service center (e.g., a 911 Center) associated with the PSAP (e.g., PSAP 314).

At operation 604, the process may include identifying, by the server, a protocol associated with the PSAP for sending the message. In some examples, the operation 604 may include converting a protocol associated with the network that receives the message (e.g., a first protocol) to a protocol associated with the PSAP (e.g., a second protocol). For instance, the PSAP may require s protocol specific for emergency communications which typically does not include providing RCS services. Using the techniques described herein, an RCS server can configure a message that includes RCS services for receipt by a computing device or user equipment associated with the PSAP.

At operation 606, the process may include formatting, by the server and based at least in part on the protocol, the message for sending to the PSAP as a formatted message. In some examples, the operation 606 may include augmenting the message to include the converted protocol. In various examples, formatting the message can include appending location information such that the formatted message, upon receipt by the PSAP, includes a location of the UE sending the message. The GMLC 312 can, in some examples, provide UE location information to the RCS server 110 and/or the IMS 306 (e.g., the RCS server causes an ECSCF to initiate a location query to the GMLC which responds with location data). In such examples, the RCS server 110 and/or the IMS 306 may implement a PCSCF to implement communications between the ECSCF, the GMLC, and/or the PSAP.

In various examples, the RCS server 110 can manage and store user information, location information, registration information, motion information, and other information associated with the UE 102. In some examples, the RCS server 110 can include some or all of the information during communications (e.g., with the PSAP). In some examples, the RCS server can send a delivery receipt message to either the UE 102 or the PSAP 314 to indicate whether a respective message was delivered and/or read by the other of the UE 102 or the PSAP 314. In various examples, delivery receipt messages may be configured by the RCS server 110 for multiple messages (e.g., Message Session Relay Protocol (MSRP) messages) in a call session. Accordingly, messages that are part of a same communication or call session may be individually associated with different read and/or delivery receipts by the RCS server 110.

At operation 608, the process may include sending, by the server, the formatted message indicating the RCS request from the UE to the PSAP. In some examples, the operation 608 may include sending the formatted message 304 from the RCS server 110 and/or the IMS 306 to the PSAP 314 over a 5G network (e.g., the 5G core network 108. In this way, the formatted message that includes a request for RCS services can be sent to a computing device or user equipment associated with the PSAP in a protocol understood by the PSAP 314. In some examples, the formatted message can comprise a priority value indicating an importance of the message relative to other incoming messages to the PSAP (e.g., a level of emergency associated with the message). For instance, a first message from a first UE having a video of an emergency medical event may receive a lower priority relative to a second message from a second UE having a video of a natural emergency event such as a weather event. The RCS server 110 may, for example, assign a priority value to a message based at least in part on determining a level of impact associated with the emergency event. Accordingly, messages potentially impacting the safety of a larger population, such as a natural disaster, can be prioritized by the PSAP based at least in part on the priority value in the formatted message.

Figure 7:
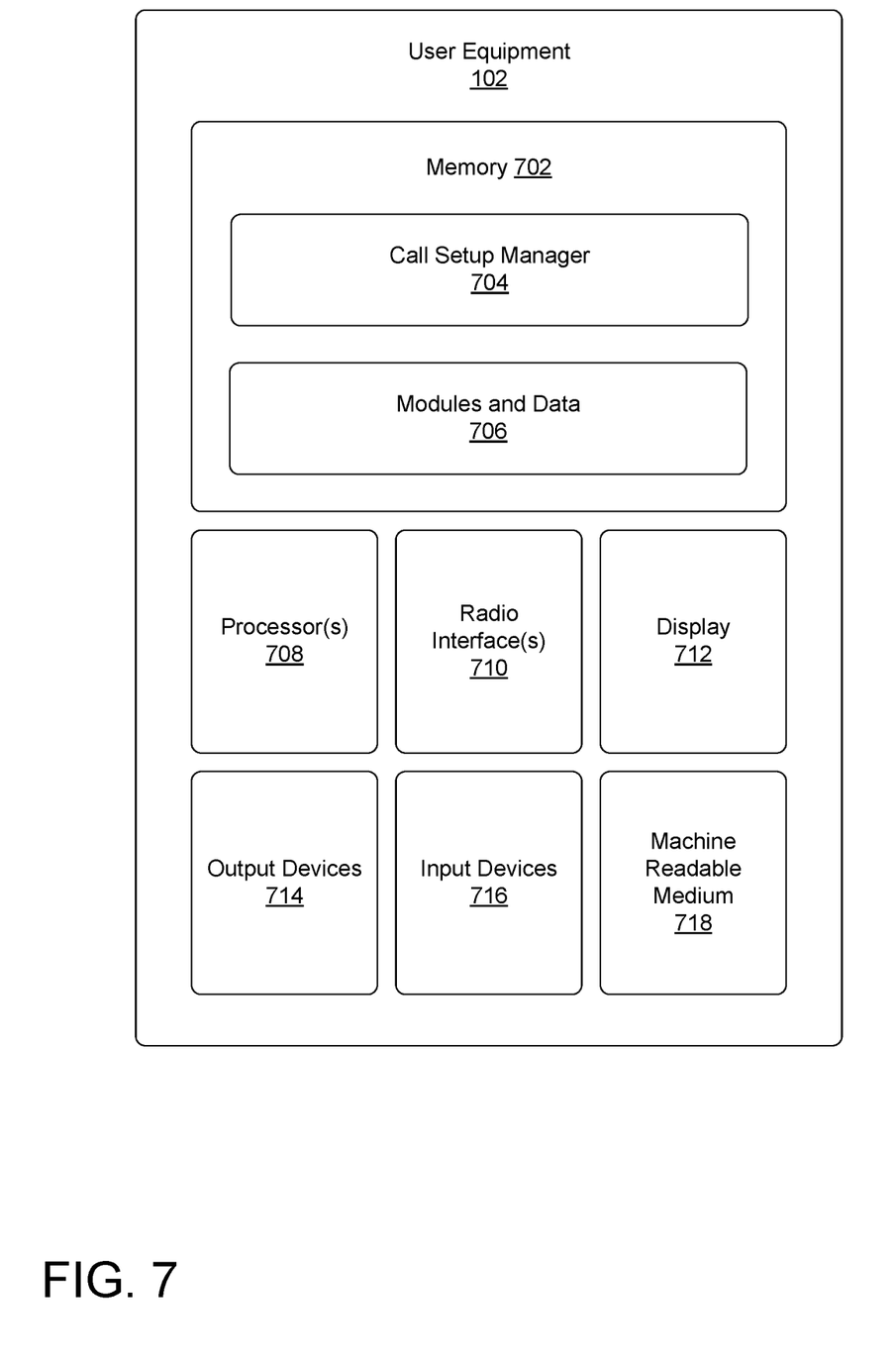
FIG. 7 depicts an example system architecture for a user equipment.

FIG. 7 depicts an example system architecture for a UE 102, in accordance with various examples. As shown, a UE 102 can have memory 702 storing a call setup manager 704, and other modules and data 706. A UE 102 can also comprise processor(s) 708, radio interfaces 710, a display 712, output devices 714, input devices 716, and/or a machine readable medium 718.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 704 can send and/or receive messages comprising RCS service including SIP messages associated with setup and management of a call session via the IMS 306. The SIP messages can include any of the SIP messages shown in FIG. 5, and/or other SIP messages.

The other modules and data 706 can be utilized by the UE 102 to perform or enable performing any action taken by the UE 102. The modules and data 706 can include a UE platform, operating system, and applications, and data utilized by the platform, operating system, and applications.

In various examples, the processor(s) 708 can be a central processing unit (CPU), a graphics processing unit (GPU), or both CPU and GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing all computer applications stored in the memory 702, which can be associated with common types of volatile (RAM) and/or nonvolatile (ROM) memory.

The radio interfaces 710 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 710 can be compatible with multiple radio access technologies, such as 5G radio access technologies and 4G/LTE radio access technologies. Accordingly, the radio interfaces 710 can allow the UE 102 to connect to the 5G system 104 described herein.

The display 712 can be a liquid crystal display or any other type of display commonly used in UEs 102. For example, display 712 may be a touch-sensitive display screen, and can then also act as an input device or keypad, such as for providing a soft-key keyboard, navigation buttons, or any other type of input. The output devices 714 can include any sort of output devices known in the art, such as the display 712, speakers, a vibrating mechanism, and/or a tactile feedback mechanism. Output devices 714 can also include ports for one or more peripheral devices, such as headphones, peripheral speakers, and/or a peripheral display. The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, that embodies any one or more of the methodologies or functions described herein. The instructions can also reside, completely or at least partially, within the memory 702, processor(s) 708, and/or radio interface(s) 710 during execution thereof by the UE 102. The memory 702 and the processor(s) 708 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving, by a server of an Internet Protocol (IP) Multimedia Subsystem (IMS) of a network, a message from a user equipment (UE) indicating a Rich Communication Services (RCS) request to a public service answering point (PSAP), wherein the IMS is separate and distinct from the PSAP;
   identifying, by the server, a protocol associated with the PSAP for sending the message;
   formatting, by the server and based at least in part on the protocol, the message for sending to the PSAP as a formatted message; and
   sending, by the server, the formatted message indicating the RCS request from the UE to the PSAP.

2. The method of claim 1, wherein the network comprises a fifth generation telecommunications network and the RCS request comprises at least one of: an image, a video, or a file transfer.

3. The method of claim 1, wherein formatting the message for sending comprises augmenting the message to be recognized in accordance with the protocol associated with the PSAP.

4. The method of claim 1, further comprising:
determining, by the server, that the message is associated with an emergency event, and
wherein identifying the protocol associated with the RCS request for sending the message is based at least in part on determining that the message is associated with the emergency event.

5. The method of claim 1, further comprising:
receiving, by the server, data associated with the message from at least one of: a proxy call session control function server, an emergency call session control function server, or a gateway mobile location center, and
wherein formatting the message for sending to the PSAP is further based at least in part on the data.

6. The method of claim 5, wherein the data represents location information associated with the message or protocol information associated with the PSAP.

7. The method of claim 1, further comprising:
determining, by the server, a conversion value to convert a protocol associated with the message received from the UE to the protocol associated with the PSAP, and
wherein identifying the protocol associated with the PSAP for sending the message is based at least in part on the conversion value.

8. The method of claim 1, wherein the network comprises a different protocol for communication of the message than the protocol associated with the PSAP.

9. The method of claim 1, wherein formatting the message for sending to the PSAP comprises assigning a priority to the message to indicate a level of emergency associated with the message.

10. A system comprising:
one or more processors; and
memory storing computer-executable instructions that, when executed by the one or more processors, cause the system to perform operations comprising:
receiving, by a server of an Internet Protocol (IP) Multimedia Subsystem (IMS) of a network, a message from a user equipment (UE) indicating a Rich Communication Services (RCS) request to a public service answering point (PSAP), wherein the IMS is separate and distinct from the PSAP;
identifying, by the server, a protocol associated with the PSAP for sending the message;
formatting, by the server and based at least in part on the protocol, the message for sending to the PSAP as a formatted message; and
sending, by the server, the formatted message indicating the RCS request from the UE to the PSAP.

11. The system of claim 10, wherein formatting the message for sending comprises augmenting the message to be recognized in accordance with the protocol associated with the PSAP.

12. The system of claim 10, the operations further comprising:
determining, by the server, that the message is associated with an emergency event, and
wherein identifying the protocol associated with the RCS request for sending the message is based at least in part on determining that the message is associated with the emergency event.

13. The system of claim 10, the operations further comprising:
receiving, by the server, data associated with the message from at least one of: a proxy call session control function server, an emergency call session control function server, or a gateway mobile location center,
wherein formatting the message for sending to the PSAP is further based at least in part on the received data.

14. The system of claim 10, the operations further comprising
determining, by the server, a conversion value to convert a protocol associated with the message received from the UE to the protocol associated with the PSAP, and
wherein identifying the protocol associated with the PSAP for sending the message is based at least in part on the conversion value.

15. A method comprising:
determining, by a server of an Internet Protocol (IP) Multimedia Subsystem (IMS) of a network, a protocol for sending a message comprising a Rich Communication Services (RCS) request from a user equipment (UE) to a public service answering point (PSAP), wherein the IMS is separate and distinct from the PSAP;
receiving, by the server, location data associated with the message from at least one of: an emergency call session control function server or a gateway mobile location center;
formatting, by the server and based at least in part on the protocol and the location data, the message for receipt by the PSAP; and
receiving a response from the PSAP indicating a channel for communicating the RCS request of the message from the UE.

16. The method of claim 15, wherein:
the RCS request comprises at least one of: an image, a video, or a file transfer, and
determining the protocol for sending the message comprises determining that the protocol is compatible for communicating the RCS request with the PSAP.

17. The method of claim 16, wherein the network comprises a fifth generation telecommunications network.

18. The method of claim 15, further comprising establishing, by the IMS and based at least in part on the response from the PSAP, a communication session between the UE and the PSAP using the channel received from the PSAP.

19. The method of claim 15, further comprising:
determining, by the server, a difference between a protocol associated with communicating the message from the UE over the network and the protocol for sending the message to the PSAP;
determining, by the server and based at least in part on the difference, a protocol conversion value; and
wherein determining the protocol for sending the message to the PSAP comprises converting, based at least in part on the protocol conversion value, the protocol associated with communicating the message from the UE over the network to the protocol for sending the message to the PSAP.

20. The method of claim 15, further comprising associating, by the server, user information, location information, timing information, or motion information associated with the UE.

* * * * *